(12) United States Patent
Samantaray et al.

(10) Patent No.: US 10,019,450 B2
(45) Date of Patent: **\*Jul. 10, 2018**

(54) AUTOMATION OF MLOAD AND TPUMP CONVERSION

(71) Applicant: BANK OF AMERICA CORPORATION, Charlotte, NC (US)

(72) Inventors: Sushanta Samantaray, Odisha (IN); Naga Lakshmi Vanga, Pradesh (IN); Nagaraju Mahankali, Jacksonville, FL (US); Dineshkumar Mohan, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/160,413

(22) Filed: May 20, 2016

(65) Prior Publication Data

US 2016/0267092 A1 Sep. 15, 2016

Related U.S. Application Data

(63) Continuation of application No. 13/917,212, filed on Jun. 13, 2013, now Pat. No. 9,384,223.

(51) Int. Cl.
*G06F 17/30* (2006.01)
(52) U.S. Cl.
CPC .. *G06F 17/30076* (2013.01); *G06F 17/30082* (2013.01); *G06F 17/30306* (2013.01)
(58) Field of Classification Search
CPC ......... G06F 17/30076; G06F 17/30306; G06F 17/30082
See application file for complete search history.

(56) References Cited

U.S. PATENT DOCUMENTS

| 5,511,194 | A | 4/1996 | Shirakata et al. |
| 5,634,120 | A | 5/1997 | Nagasuka et al. |
| 6,233,727 | B1 | 5/2001 | Nagasuka et al. |
| 6,564,307 | B1 | 5/2003 | Micka et al. |
| 7,260,569 | B1 * | 8/2007 | Stegelmann ............. G06F 8/31 707/781 |

(Continued)

OTHER PUBLICATIONS

Dewey, "Teradata Utility Error Handling—Multiload," web archive of Apr. 11, 2012, Teradata Developer Exchange (Year: 2012).*

(Continued)

*Primary Examiner* — Ashish Thomas
*Assistant Examiner* — Jedidiah P Ferrer
(74) *Attorney, Agent, or Firm* — Michael A. Springs; Moore & Van Allen PLLC; Peter B. Stewart

(57) ABSTRACT

Embodiments of the invention are directed to systems, methods and computer program products for converting MLOAD and TPUMP operations. In some embodiments, a system is configured to: receive an input production parameter, wherein the input production parameter is associated with a load utility and defines a library of parameters, wherein the library of parameters defines a first syntax; convert the first syntax of the library of parameters to a second syntax, wherein the second syntax is associated with the load utility; validate the second syntax of the library of parameters; and write an output parameter to a memory location based on positive validation of the second syntax of the library of parameters.

24 Claims, 4 Drawing Sheets

(56) References Cited

U.S. PATENT DOCUMENTS

| | | |
|---|---|---|
| 7,788,638 B2 | 8/2010 | Hoberman et al. |
| 8,020,161 B2 | 9/2011 | Markov |
| 8,234,372 B2 | 7/2012 | Knapp et al. |
| 8,260,913 B2 | 9/2012 | Knapp et al. |
| 8,306,948 B2 | 11/2012 | Chou et al. |
| 8,341,363 B2 | 12/2012 | Chou et al. |
| 8,392,838 B2 | 3/2013 | Chawla et al. |
| 8,892,677 B1 | 11/2014 | Grove et al. |
| 2004/0254948 A1* | 12/2004 | Yao .................. G06F 17/30563 707/999.101 |
| 2005/0063526 A1 | 3/2005 | Smith |
| 2007/0078853 A1 | 4/2007 | Shutt |
| 2008/0201747 A1 | 8/2008 | Cooper |
| 2010/0191783 A1 | 7/2010 | Mason et al. |
| 2010/0287219 A1 | 11/2010 | Caso et al. |
| 2010/0333116 A1 | 12/2010 | Prahlad et al. |
| 2011/0191425 A1 | 8/2011 | Brodeur et al. |
| 2011/0225229 A1 | 9/2011 | Srivastava et al. |
| 2011/0252071 A1 | 10/2011 | Cidon |
| 2012/0084261 A1 | 4/2012 | Parab |
| 2012/0096368 A1 | 4/2012 | McDowell |
| 2012/0150881 A1 | 6/2012 | Cho et al. |
| 2012/0203742 A1 | 8/2012 | Goodman et al. |
| 2012/0317164 A1 | 12/2012 | Zhou |
| 2013/0097275 A1 | 4/2013 | Wofford, IV et al. |
| 2013/0144845 A1 | 6/2013 | Ghuge et al. |
| 2013/0218845 A1 | 8/2013 | Kleppner et al. |
| 2013/0219140 A1 | 8/2013 | Hanson et al. |
| 2014/0304836 A1 | 10/2014 | Velamoor et al. |

OTHER PUBLICATIONS

Teradata MultiLoad Reference Release 13, 10, Feb. 2010, pp. 1-258.
Teradata Developer Exchange, Jan. 2008, p. 1.
IBM Mainframe Help: Flat file record count with Syncsort, Aug. 5, 2008, pp. 1-3.
Teradata data loading tools—Multiload, FastLoad and TPump, May 15, 2011, pp. 1-3.

\* cited by examiner

AUTOMATION OF MLOAD AND TPUMP CONVERSION

CROSS-REFERENCE TO RELATED APPLICATION(S)

This application is a continuation of U.S. patent application Ser. No. 13/917,212, filed Jun. 13, 2013, of the same title, the entirety of which is incorporated herein by reference.

BACKGROUND

There is a need to enable a user to quickly and efficiently convert MLOAD and TPUMP operations.

BRIEF SUMMARY

In some embodiments, an apparatus for converting MLOAD and TPUMP operations is provided. The apparatus comprises a memory, a processor, and a module stored in memory, executable by the processor, and configured to: receive an input production parameter, wherein the input production parameter is associated with a load utility and defines a library of parameters, wherein the library of parameters defines a first syntax; convert the first syntax of the library of parameters to a second syntax, wherein the second syntax is associated with the load utility; validate the second syntax of the library of parameters; and write an output parameter to a memory location based on positive validation of the second syntax of the library of parameters.

In some embodiments, receiving the input production parameter comprises determining the type of load utility.

In some embodiments, determining the type of load utility comprises counting a number of incoming records.

In some embodiments, the load utility is MLOAD.

In some embodiments, the load utility is TPUMP.

In some embodiments, the library of parameters is stored in a database.

In some embodiments, the library of parameters is configured to be overridden by the output parameter.

In some embodiments, the library of parameters comprises parameters.

In some embodiments, parameters comprise a Log table, a Work table, a UV table, and an Error table.

In some embodiments, converting the first syntax of the library of parameters comprises deleting a parameter associated with the first syntax.

In some embodiments, converting the first syntax of the library of parameters comprises editing a parameter associated with the first syntax.

In some embodiments, converting the first syntax of the library of parameters comprises adding a parameter associated with the second syntax.

In some embodiments, converting the first syntax comprises generating at least one script and computer code of the library of the parameters using the second syntax.

In some embodiments, validating the second syntax of the library of parameters comprises using a compiler.

In some embodiments, validating the second syntax of the library of parameters comprises storing the second syntax of the library of parameters in a memory location.

In some embodiments, validating the second syntax of the library of parameters comprises comparing the second syntax to a table stored in a second memory location that contains syntax associated with the load utility.

In some embodiments, writing the output parameter to a memory location comprises overwriting a second output parameter in the memory location.

In some embodiments, writing the output parameter to a memory location enables the apparatus to load incoming information with the identified load utility.

In some embodiments, a method for converting MLOAD and TPUMP operations is provided. The method comprises: receiving an input production parameter, wherein the input production parameter is associated with a load utility and defines a library of parameters, wherein the library of parameters defines a first syntax; converting the first syntax of the library of parameters to a second syntax, wherein the second syntax is associated with the load utility; validating the second syntax of the library of parameters; and writing an output parameter to a memory location based on positive validation of the second syntax of the library of parameters.

In some embodiments, a computer program product for converting MLOAD and TPUMP operations is provided. The computer program product comprises a non-transitory computer-readable medium comprising code causing a computer to: receive an input production parameter, wherein the input production parameter is associated with a load utility and defines a library of parameters, wherein the library of parameters defines a first syntax; convert the first syntax of the library of parameters to a second syntax, wherein the second syntax is associated with the load utility; validate the second syntax of the library of parameters; and write an output parameter to a memory location based on positive validation of the second syntax of the library of parameters.

BRIEF DESCRIPTION OF THE DRAWINGS

Figure 1:
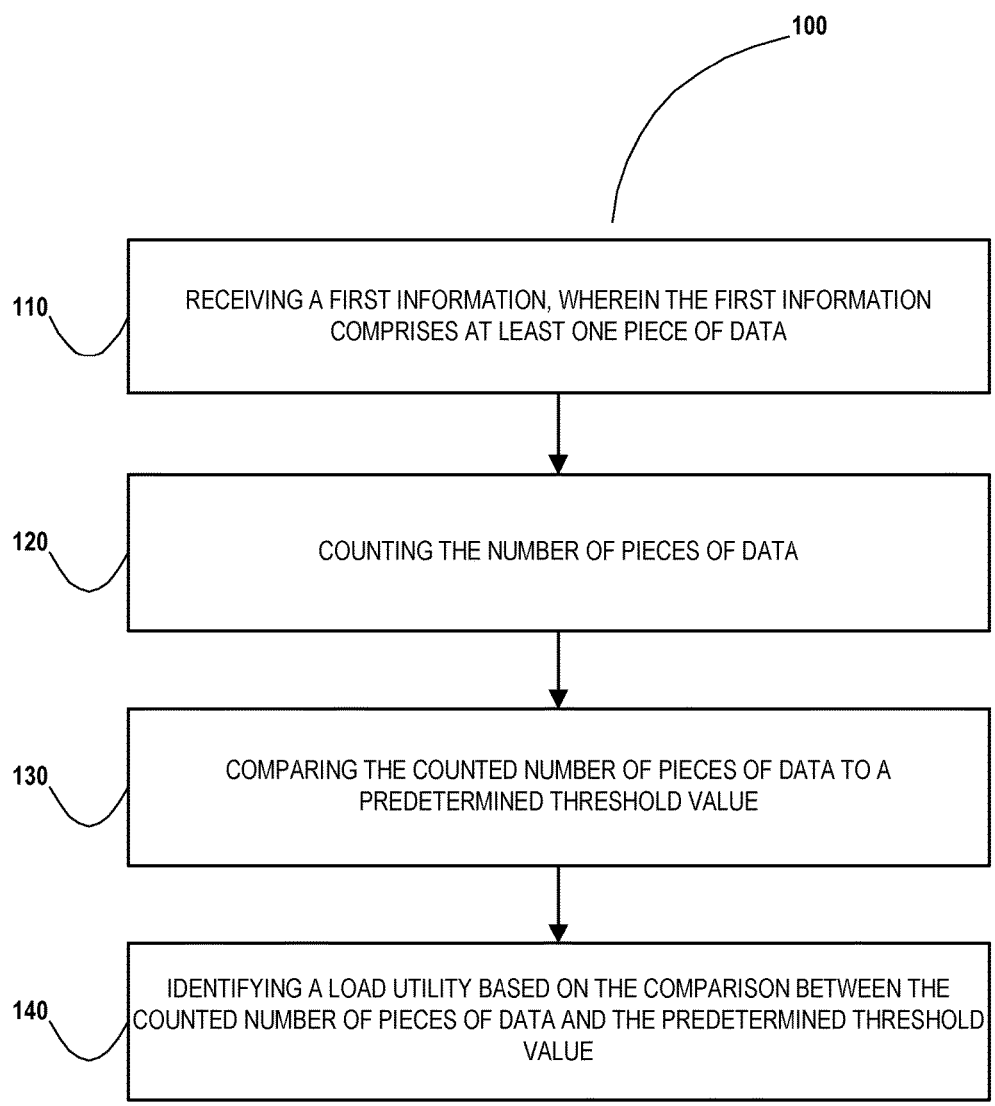
Figure 2:
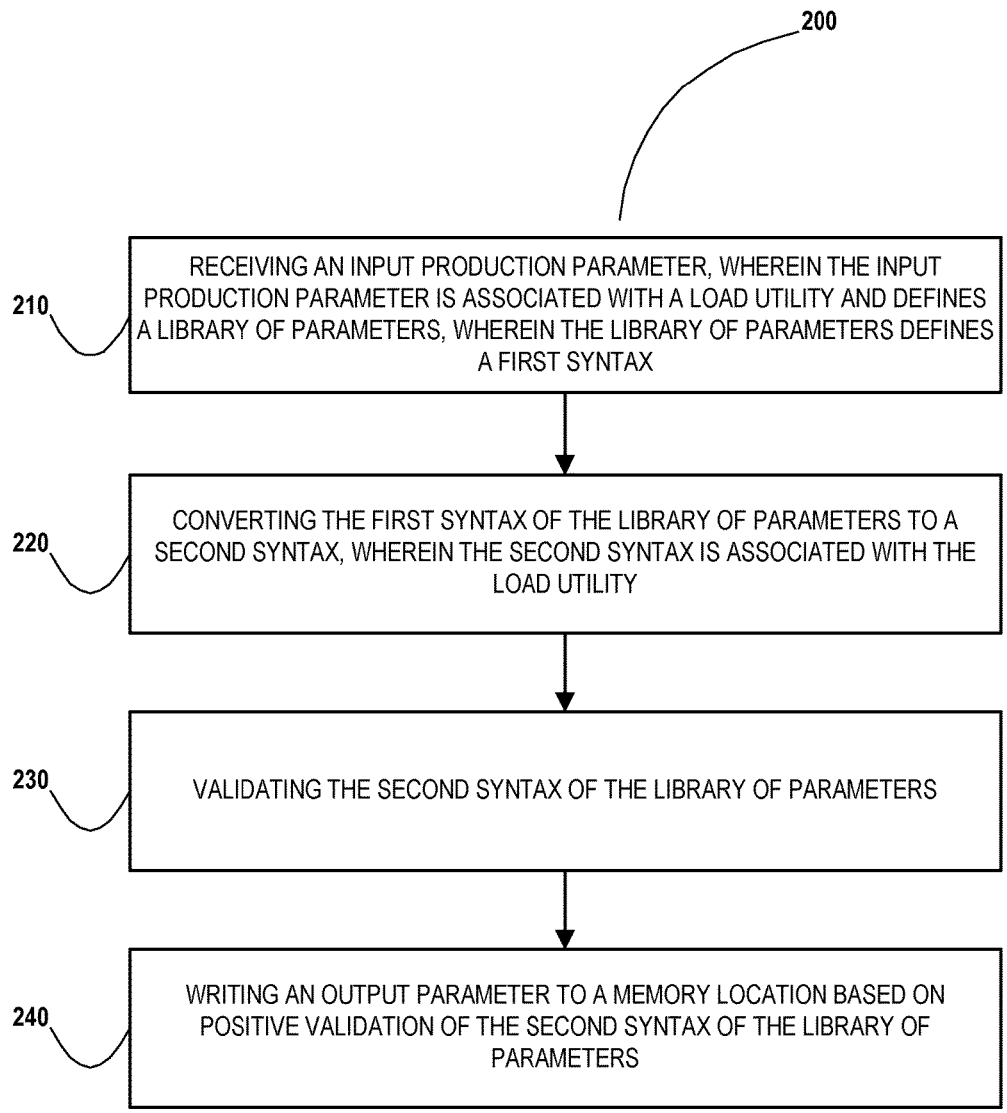
Figure 3:
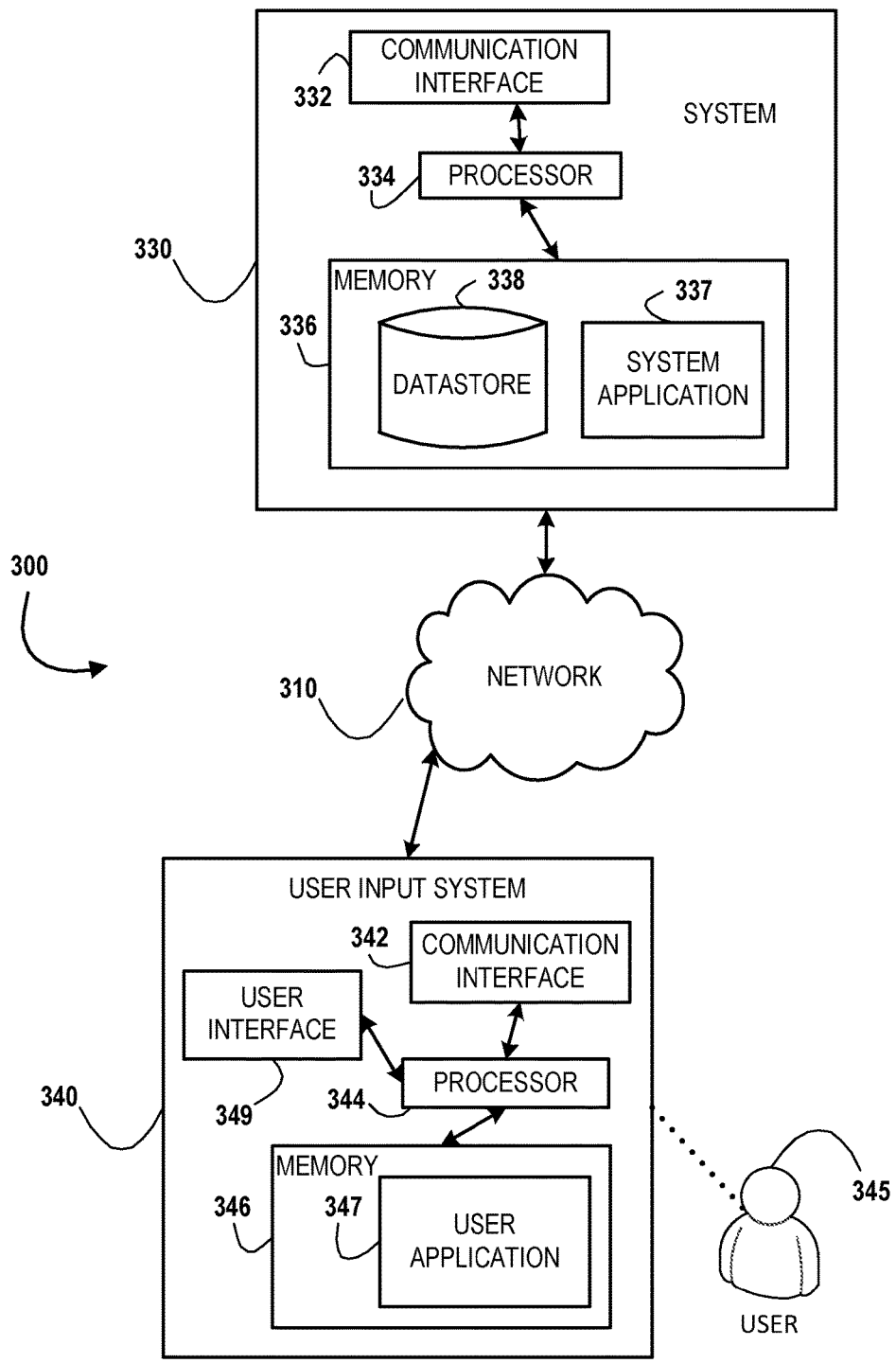
Figure 4:
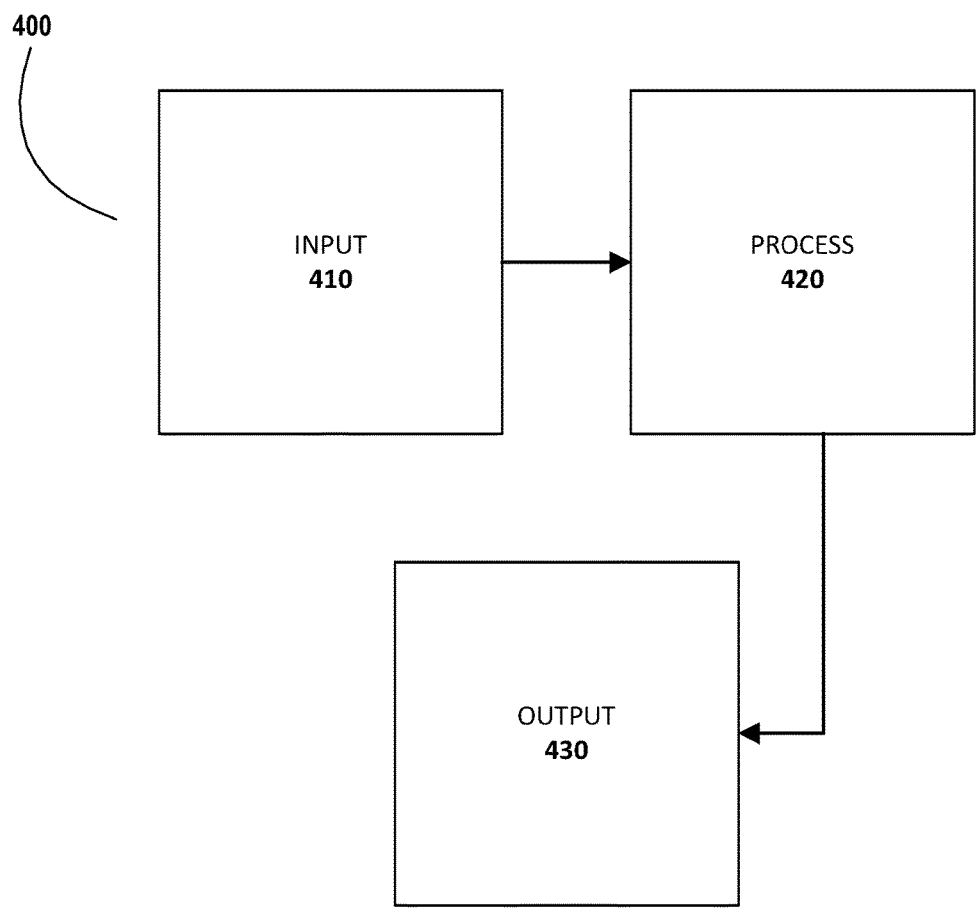

Having thus described embodiments of the invention in general terms, reference will now be made to the accompanying drawings, where:

FIG. 1 is a general process flow for identifying a load utility;

FIG. 2 is an exemplary user interface for converting MLOAD and TPUMP operations, in accordance with embodiments of the present invention;

FIG. 3 is a block diagram illustrating technical components of a system for converting MLOAD and TPUMP operations, in accordance with embodiments of the present invention; and FIG. 4 is a block diagram illustrating the automated process of converting a load utility.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, a "user" may be an agent (customer service representative, internal operations specialist, bank teller, account manager, IT technician, database manager, mainframe operator, or the like) associated with the entity. The user may also be a customer (e.g. an account holder or a person who has an account (e.g. banking account, credit account, or the like) at the entity) or a merchant (e.g. a business, a vendor, a service provider, or the like).

The present invention may enable an apparatus (e.g. a computer system) associated with the entity to efficiently load incoming information (entries in a CSV file, data, metadata, or the like) into a database (a mainframe, a datastore, a memory location, a table, or the like). The apparatus may dynamically load incoming information into a database via two different load utilities, namely MLOAD (a Teradata "multiload" load utility) and TPUMP (a Teradata load utility that does not lock tables). Generally speaking, the apparatus may utilize the MLOAD load utility for larger volumes of information while the TPUMP load utility may be utilized for smaller volumes of incoming information. Therefore, MLOAD typically uses more computer resources than TPUMP.

The entity's current database management system may require the user to manually determine which load utility is appropriate to use for a volume of incoming information. The user may be required to manually switch between the two load utilities. These manual processes may often require writing computer code and thus may be time consuming and laborious. Furthermore, using the MLOAD load utility for a small volume of incoming information may be a costly and inefficient use of computer resources.

The present invention may include an automated system for determining the appropriate load utility. The appropriate load utility may be determined based on the volume of incoming information. Once the appropriate load utility has been determined, the present invention may be configured to automatically switch between the two load utilities to ensure that the apparatus is loading the incoming information with the appropriate load utility. Automating these two processes may better allocate computer resources and thus save the entity time and money.

First, the apparatus may receive at least one input production parameter. The at least one input production parameter may include incoming information (information associated with a transaction, information associated with an account, or the like). The at least one input production parameter may be used to identify the type, the size, or the volume of the incoming information.

The apparatus may analyze the at least one input production parameter to determine the volume of incoming information. In some embodiments, the apparatus may utilize a counter or an ICETOOL (a utility that counts or sorts information) to count the number of pieces of incoming information associated with the at least one input production parameter. In some embodiments, the count of pieces of incoming information associated with the at least one input production parameter may be stored in memory. In other embodiments, the count of pieces of incoming information associated with the at least one input production parameter may be compared to a predetermined threshold value. This threshold value may define a cutoff value for determining the appropriate load utility. Comparing the count of pieces of incoming information associated with the at least one input production parameter to the threshold value may create one of three potential cases.

In some embodiments, the count of pieces of incoming information associated with the at least one input production parameter may be less than the predetermined threshold value. A count of pieces of incoming information associated with the at least one input production parameter that is less than the predetermined threshold value may suggest that there is a smaller volume of incoming information. So, the apparatus may automatically configure the system to load the incoming information using the TPUMP load utility. This configuration may save computer resources by using TPUMP, the load utility that requires less computer resources.

In other embodiments, the count of pieces of incoming information associated with the at least one input production parameter may be greater than the predetermined threshold value. A count of pieces of incoming information associated with the at least one input production parameter that is greater than the predetermined threshold value may suggest that there is a larger volume of incoming information. So, the apparatus may automatically configure the system to load the incoming information using the MLOAD load utility. While this configuration may use more computer resources, using the MLOAD load utility may ensure that the larger volume of incoming information is efficiently and accurately loaded into the database.

In alternative embodiments, the count of pieces of incoming information associated with the at least one input production parameter may be equal to the predetermined threshold value. Hence, the apparatus may be configured to load the incoming information using either of the two load utilities. The entity may reserve the right to determine which load utility to use when the counted number of pieces of incoming information is found to be equal to the predetermined threshold value. For example, if the entity is focused on saving computer resources, TPUMP may be used to input the incoming information into the database. Conversely, if the entity is focused on accuracy when loading incoming information, MLOAD may be used to input the incoming information into the database.

Once the appropriate load utility is determined, the apparatus may be configured to automatically convert the database management system to the appropriate load utility. The apparatus may first determine if the system is already configured with the appropriate type of load utility. For example, if the previous input production parameter required use of the MLOAD load utility and the present input production parameter requires the MLOAD load utility, then no conversion may be necessary. Conversely, if the previous input production parameter required use of the MLOAD load utility and the present input production parameter requires the TPUMP load utility, then a conversion may be necessary.

To convert the database management system to the appropriate load utility, the apparatus may automatically retrieve a library of parameters associated with the determined appropriate load utility. The apparatus may then analyze the library of parameters to locate parameters (a Log table, a UV table, a Work table, an Error table, or the like) that are not associated with the determined appropriate utility. If any unassociated parameters are found, the apparatus may automatically delete the unassociated parameters from the library of parameters.

For example, if the MLOAD load utility is determined to be the appropriate load utility and the apparatus locates TPUMP-related parameters in the library of parameters, the apparatus may automatically delete the TPUMP-related parameters. Conversely, if the TPUMP load utility is determined to be the appropriate load utility and the apparatus locates MLOAD-related parameters in the library of parameters, the apparatus may automatically delete the MLOAD-related parameters.

In other embodiments, the apparatus may not delete the unassociated parameters, but may flag them or edit them to comply with the syntax of the appropriate load utility. The apparatus may automatically change, add, or edit parameters in accordance with the syntax associated with the determined appropriate load utility. For example, if the MLOAD load utility is determined to be the appropriate load utility for the present input production parameter, the apparatus may automatically add a statement, a parameter, or the like into the library of parameters in accordance with the syntax associated with the MLOAD load utility. Conversely, if the TPUMP load utility is determined to be the appropriate load utility for the present input production parameter, the apparatus may automatically add statements, parameters, or the like into the library of parameters in accordance with the syntax associated with the TPUMP load utility. This process may ensure that the library of parameters contains statements that are executable in the conversion process.

Once the library of parameters is converted into the appropriate syntax by the apparatus, the apparatus may validate the library of parameters (or a script, computer code, or the like associated with the library of parameters). In some embodiments, the apparatus may utilize a compiler or similar software to verify that the library of parameters contains the appropriate syntax and that all aspects of the library of parameters are executable.

In some embodiments, the apparatus may automatically overwrite a previous library of parameters with the library of parameters associated with the present incoming information. This process is meant to ensure that the library of parameters associated with the present incoming information is used to input the incoming information. In other embodiments, the apparatus may overwrite the previous library of parameters with the library of parameters associated with the present incoming information in a specific memory location. In alternative embodiments, the apparatus may override the library of parameters with the library of parameters associated with the present incoming information and output the present library of parameters to a second apparatus in the database management system.

Next, the apparatus may begin to input the incoming information into the database using the determined appropriate load utility. The incoming information may be stored in the database for a predetermined period of time or in a predetermined storage location. The entity may reserve the right to determine the period of time during which the incoming information may be stored as well as the storage location.

FIG. 1 illustrates a general process flow 100 for identifying the load utility, either MLOAD or TPUMP. At block 110 the process includes receiving a first information, wherein the first information comprises at least one piece of data. At block 120 the process includes counting the number of pieces of data. At block 130 the process includes comparing the counted number of pieces of data to a predetermined threshold value. At block 140 the process includes identifying a load utility based on the comparison between the counted number of pieces of data and the predetermined threshold value.

FIG. 2 illustrates a general process flow 200 for dynamically converting a database management system between two load utilities, namely MLOAD and TPUMP. At block 210 the process includes receiving an input production parameter, wherein the input production parameter is associated with a load utility and defines a library of parameters, wherein the library of parameters defines a first syntax. At block 220 the process includes converting the first syntax of the library of parameters to a second syntax, wherein the second syntax is associated with the load utility. At block 230 the process includes validating the second syntax of the library of parameters. At block 240 the process includes writing an output parameter to a memory location based on positive validation of the second syntax of the library of parameters.

FIG. 3 presents an exemplary block diagram of the system environment 300 for implementing the process flow described in FIGS. 1 and 2 in accordance with embodiments of the present invention. As illustrated, the system environment 300 includes a network 310, a system 330, and a user input system 340. Also shown in FIG. 3 is a user 345 of the user input system 340. The user input system 340 may be a mobile device described herein. The user 345 may be a person who uses the user input system 340 to execute a user application 347. The user application 347 may be an application to communicate with the system 330, perform a transaction, input information onto a user interface presented on the user input system 340, or the like. The user application 347 and/or the system application 337 may incorporate one or more parts of any process flow described herein.

As shown in FIG. 3, the system 330, and the user input system 340 are each operatively and selectively connected to the network 310, which may include one or more separate networks. In addition, the network 310 may include a telecommunication network, local area network (LAN), a wide area network (WAN), and/or a global area network (GAN), such as the Internet. It will also be understood that the network 310 may be secure and/or unsecure and may also include wireless and/or wireline and/or optical interconnection technology.

The user input system 340 may include any computerized apparatus that can be configured to perform any one or more of the functions of the user input system 340 described and/or contemplated herein. For example, the user 345 may use the user input system 340 to transmit and/or receive information or commands to and from the system 330. In some embodiments, for example, the user input system 340 may include a personal computer system (e.g. a non-mobile or non-portable computing system, a motor vehicle, or the like), a mobile computing device, a personal digital assistant, a mobile phone, a tablet computing device, a network device, and/or the like. As illustrated in FIG. 3, in accordance with some embodiments of the present invention, the user input system 340 includes a communication interface 342, a processor 344, a memory 346 having an user application 347 stored therein, and a user interface 349. In such embodiments, the communication interface 342 is operatively and selectively connected to the processor 344, which is operatively and selectively connected to the user interface

349 and the memory 346. In some embodiments, the user 345 may use the user application 347 to execute processes described with respect to the process flows described herein. Specifically, the user application 347 executes the process flow described in FIG. 1.

Each communication interface described herein, including the communication interface 342, generally includes hardware, and, in some instances, software, that enables the user input system 340, to transport, send, receive, and/or otherwise communicate information to and/or from the communication interface of one or more other systems on the network 310. For example, the communication interface 342 of the user input system 340 may include a wireless transceiver, modem, server, electrical connection, and/or other electronic device that operatively connects the user input system 340 to another system such as the system 330. The wireless transceiver may include a radio circuit to enable wireless transmission and reception of information. Additionally, the user input system 340 may include a positioning system. The positioning system (e.g. a global positioning system (GPS), a network address (IP address) positioning system, a positioning system based on the nearest cell tower location, or the like) may enable at least one of the user input system 340 or an external server or computing device in communication with the user input system 340 to determine the location (e.g. location coordinates) of the user input system 340.

Each processor described herein, including the processor 344, generally includes circuitry for implementing the audio, visual, and/or logic functions of the user input system 340. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 347 of the memory 346 of the user input system 340.

Each memory device described herein, including the memory 346 for storing the user application 347 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 346 includes the user application 347. The user application 347 may be associated with various features of the device identification program. In some embodiments, the user application 347 includes an interface for communicating with, navigating, controlling, configuring, and/or using the user input system 340. In some embodiments, the user application 347 includes computer-executable program code portions for instructing the processor 344 to perform one or more of the functions of the user application 347 described and/or contemplated herein. In some embodiments, the user application 347 may include and/or use one or more network and/or system communication protocols.

Also shown in FIG. 3 is the user interface 349. In some embodiments, the user interface 349 includes one or more output devices, such as a display and/or speaker, for presenting information to the user 345. In some embodiments, the user interface 349 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 345. In some embodiments, the user interface 349 includes the input and display devices of a mobile device, which are operable to receive and display information.

FIG. 3 also illustrates a system 330, in accordance with an embodiment of the present invention. The system 330 may refer to the "apparatus" described herein. The system 330 may include any computerized apparatus that can be configured to perform any one or more of the functions of the system 330 described and/or contemplated herein. In accordance with some embodiments, for example, the system 330 may include a computer network, an engine, a platform, a server, a database system, a front end system, a back end system, a personal computer system, and/or the like. Therefore, the system 330 may be a server managed by the entity. The system 330 may be located at the facility associated with the entity or remotely from the facility associated with the entity. In some embodiments, such as the one illustrated in FIG. 3, the system 330 includes a communication interface 332, a processor 334, and a memory 336, which includes a system application 337 and a datastore 338 stored therein. As shown, the communication interface 332 is operatively and selectively connected to the processor 334, which is operatively and selectively connected to the memory 336.

It will be understood that the system application 337 may be configured to implement any one or more portions of the various user interfaces and/or process flow described herein. The system application 337 may interact with the user application 347. It will also be understood that, in some embodiments, the memory includes other applications. It will also be understood that, in some embodiments, the system application 337 is configured to communicate with the datastore 338, the user input system 340, or the like.

It will be further understood that, in some embodiments, the system application 337 includes computer-executable program code portions for instructing the processor 334 to perform any one or more of the functions of the system application 337 described and/or contemplated herein. In some embodiments, the system application 337 may include and/or use one or more network and/or system communication protocols.

In addition to the system application 337, the memory 336 also includes the datastore 338. As used herein, the datastore 338 may be one or more distinct and/or remote datastores. In some embodiments, the datastore 338 is not located within the system and is instead located remotely from the system. In some embodiments, the datastore 338 stores information or data described herein. For example, the datastore 338 may store information associated with the user's account.

It will be understood that the datastore 338 may include any one or more storage devices, including, but not limited to, datastores, databases, and/or any of the other storage devices typically associated with a computer system. It will also be understood that the datastore 338 may store information in any known way, such as, for example, by using one or more computer codes and/or languages, alphanumeric character strings, data sets, figures, tables, charts, links, documents, and/or the like. Further, in some embodiments, the datastore 338 may include information associated with one or more applications, such as, for example, the system application 337. It will also be understood that, in some embodiments, the datastore 338 provides a substantially real-time representation of the information stored therein, so that, for example, when the processor 334 accesses the datastore 338, the information stored therein is current or substantially current.

It will be understood that the embodiment of the system environment illustrated in FIG. 3 is exemplary and that other embodiments may vary. As another example, in some embodiments, the system 330 includes more, less, or different components. As another example, in some embodiments, some or all of the portions of the system environment 300 may be combined into a single portion. Likewise, in some embodiments, some or all of the portions of the system 330 may be separated into two or more distinct portions.

In addition, the various portions of the system environment 300 may be maintained for and/or by the same or separate parties. It will also be understood that the system 330 may include and/or implement any embodiment of the present invention described and/or contemplated herein. For example, in some embodiments, the system 330 is configured to implement any one or more of the embodiments of the process flows described and/or contemplated herein in connection any process flow described herein. Additionally, the system 330 or the user input system 340 is configured to initiate presentation of any of the user interfaces described herein.

FIG. 4 depicts the automated process 400 for converting a load utility. As described in detail above, the process 400 includes receiving an input (an input production parameter, incoming information, or the like) at block 410. Processing the input at block 420 includes determining the type of input (whether it requires MLOAD or TPUMP), editing the syntax of the library of parameters according to the determined type of input, validating the script, and writing the code to override the library of parameters. At block 430, the output includes overriding the library of parameters.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer program product for converting MLOAD and TPUMP operations, the computer program product comprising a non-transitory computer-readable medium comprising computer program code configured to cause at least one processor to perform the following operations when the processor executes the computer program code:
   electronically receive an input production parameter, wherein the input production parameter is associated with a load utility and defines a library of parameters, wherein the input production parameter comprises one or more records, wherein the library of parameters defines a first syntax, wherein the library of parameters comprise at least one of a Log table, a Work table, a Uniqueness Violation (UV) table, and/or an Error table;
   count the number of records in the input production parameter;
   compare the counted number of records to a predetermined threshold value;
   identify the load utility to be used to load the records into a database based on the comparison between the counted number of records and the predetermined threshold value, wherein identifying further comprises (i) determining that the number of records is greater than the predetermined threshold, and loading the input production parameter into a database using a multiload load utility (MLOAD); (ii) determining that the number of records is less than the predetermined threshold, and loading the input production parameter into the database using a Teradata load utility (TPUMP) or (iii) determining that the number of records equals the predetermined threshold, and loading the first information into a data base using either the MLOAD or the TPUMP utility, whereby larger volumes of records are processed using the MLOAD load utility and smaller volumes of records are processed using the TPUMP utility, and whereby less computer resources are used to implement TPUMP than MLOAD thereby providing for conservation of computer resources;
   load the input production parameter into the database, wherein loading further comprises switching the loading of the input production parameter into the database between the MLOAD load utility and the TPUMP utility based on at least comparing the counted number of records to the predetermined threshold value;
   convert the first syntax of the library of parameters to a second syntax, wherein the second syntax is associated with the identified load utility, wherein converting the first syntax comprises generating at least one script and computer code of the library of the parameters using the second syntax, wherein converting further comprises:
      identifying one or more unassociated parameters, wherein the one or more unassociated parameters are not associated with the identified load utility;
      automatically editing the one or more unassociated parameters to comply with the second syntax, wherein automatically editing further comprises automatically adding a statement and a parameter into the library of parameters associated with the identified load utility; and
      updating the library of parameters based on at least automatically editing the one or more unassociated parameters;
   validate the second syntax of the library of parameters, wherein validating the second syntax of the library of parameters comprises using a compiler; and
   write an output parameter to a memory location based on positive validation of the second syntax of the library of parameters.

2. The computer program product of claim 1, wherein the computer program code for receiving the input production parameter comprises computer program code for determining the type of load utility.

3. The computer program product of claim 1, wherein if the number of records equals the predetermined threshold either loading the first information into a data base using the MLOAD utility for increased accuracy or loading the first information into a data base using the TPUMP utility for conservation of computing resources.

4. The computer program product of claim 1, wherein said computer program code for causing the processor to automatically edit the one or more unassociated parameters to comply with the second syntax, comprises computer program code for causing the processor to delete the unassociated parameters.

5. The computer program product of claim 1, wherein said computer program code for causing the processor to update the library of parameters based on at least automatically editing the one or more unassociated parameters, wherein such update further comprises overwriting the library of parameters.

6. The computer program product of claim 1, wherein the library of parameters is stored in a database.

7. The computer program product of claim 1, wherein the library of parameters is configured to be overridden by the output parameter.

8. The computer program product of claim 1, wherein said computer program code for causing the processor to convert the first syntax of the library of parameters comprises computer program code for causing the processor to delete a parameter associated with the first syntax.

9. The computer program product of claim 1, wherein said computer program code for causing the processor to validate the second syntax of the library of parameters comprises computer program code for causing the processor to store the second syntax of the library of parameters in a memory location.

10. The computer program product of claim 1, wherein said computer program code for causing the processor to validate the second syntax of the library of parameters comprises computer program code for causing the processor to compare the second syntax to a table stored in a second memory location that contains syntax associated with the load utility.

11. The computer program product of claim 1, wherein said computer program code for causing the processor to write the output parameter to a memory location comprises computer program code for causing the processor to overwrite a second output parameter in the memory location.

12. The computer program product of claim 1, wherein said computer program code for causing the processor to write the output parameter to a memory location enables the processor to load incoming information with the identified load utility.

13. A computer implemented method for converting MLOAD and TPUMP operations, the method comprising:
electronically receiving an input production parameter, wherein the input production parameter is associated with a load utility and defines a library of parameters, wherein the input production parameter comprises one or more records, wherein the library of parameters defines a first syntax, wherein the library of parameters comprise at least one of a Log table, a Work table, a Uniqueness Violation (UV) table, and/or an Error table;
counting the number of records in the input production parameter;
comparing the counted number of records to a predetermined threshold value;
identifying the load utility to be used to load the records into a database based on the comparison between the counted number of records and the predetermined threshold value, wherein identifying further comprises (i) determining that the number of records is greater than the predetermined threshold, and loading the input production parameter into a database using a multiload load utility (MLOAD); (ii) determining that the number of records is less than the predetermined threshold, and loading the input production parameter into the database using a Teradata load utility (TPUMP) or (iii) determining that the number of records equals the predetermined threshold, and loading the first information into a data base using either the MLOAD or the TPUMP utility, whereby larger volumes of records are processed using the MLOAD load utility and smaller volumes of records are processed using the TPUMP utility, and whereby less computer resources are used to implement TPUMP than MLOAD thereby providing for conservation of computer resources;
loading the input production parameter into the database, wherein loading further comprises switching the loading of the input production parameter into the database between the MLOAD load utility and the TPUMP utility based on at least comparing the counted number of records to the predetermined threshold value;
converting the first syntax of the library of parameters to a second syntax, wherein the second syntax is associated with the identified load utility, wherein converting the first syntax comprises generating at least one script and computer code of the library of the parameters using the second syntax, wherein converting further comprises:
identifying one or more unassociated parameters, wherein the one or more unassociated parameters are not associated with the identified load utility;
automatically editing the one or more unassociated parameters to comply with the second syntax, wherein automatically editing further comprises automatically adding a statement and a parameter into the library of parameters associated with the identified load utility; and
updating the library of parameters based on at least automatically editing the one or more unassociated parameters;
validating the second syntax of the library of parameters, wherein validating the second syntax of the library of parameters comprises using a compiler; and
writing an output parameter to a memory location based on positive validation of the second syntax of the library of parameters.

14. The computer implemented method of claim 13, wherein receiving the input production parameter comprises determining the type of load utility.

15. The computer implemented method of claim 13, wherein if the number of records equals the predetermined threshold either loading the first information into a data base using the MLOAD utility for increased accuracy or loading the first information into a data base using the TPUMP utility for conservation of computing resources.

16. The computer implemented method of claim 13, wherein automatically editing the one or more unassociated parameters to comply with the second syntax, comprises deleting the unassociated parameters.

17. The computer implemented method of claim 13, wherein updating the library of parameters based on at least automatically editing the one or more unassociated parameters, wherein updating further comprises overwriting the library of parameters.

18. The computer implemented method of claim 13, wherein the library of parameters is stored in a database.

19. The computer implemented method of claim 13, wherein the library of parameters is configured to be overridden by the output parameter.

20. The computer implemented method of claim 13, wherein converting the first syntax of the library of parameters comprises deleting a parameter associated with the first syntax.

21. The computer implemented method of claim 13, wherein validating the second syntax of the library of parameters comprises storing the second syntax of the library of parameters in a memory location.

22. The computer implemented method of claim 13, wherein validating the second syntax of the library of parameters comprises comparing the second syntax to a table stored in a second memory location that contains syntax associated with the load utility.

23. The computer implemented method of claim 13, wherein writing the output parameter to a memory location comprises overwriting a second output parameter in the memory location.

24. The computer implemented method of claim 13, wherein writing the output parameter to a memory location enables the computer implemented method to load incoming information with the identified load utility.

* * * * *